US012470600B2

(12) United States Patent
Tiwari et al.

(10) Patent No.: US 12,470,600 B2
(45) Date of Patent: Nov. 11, 2025

(54) CYBER TWIN OF NGFW FOR SECURITY POSTURE MANAGEMENT

(71) Applicant: Palo Alto Networks, Inc., Santa Clara, CA (US)

(72) Inventors: Praveen Tiwari, Milpitas, CA (US); Hai Lin, Santa Clara, CA (US); Didac de la Iglesia, Sant Fost de Campsentelles (ES); Prem Jayaraj, Sunnyvale, CA (US); Gaurav Sharma, Mountain View, CA (US); Manish Sampat, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 71 days.

(21) Appl. No.: 18/216,502

(22) Filed: Jun. 29, 2023

(65) Prior Publication Data
US 2025/0007952 A1    Jan. 2, 2025

(51) Int. Cl.
*H04L 9/40*        (2022.01)
*H04L 41/0894*     (2022.01)
*H04L 43/06*       (2022.01)

(52) U.S. Cl.
CPC .......... *H04L 63/20* (2013.01); *H04L 41/0894* (2022.05); *H04L 43/06* (2013.01)

(58) Field of Classification Search
CPC ...... H04L 63/20; H04L 41/0894; H04L 43/06
USPC .......................................................... 726/1
See application file for complete search history.

(56) References Cited

U.S. PATENT DOCUMENTS

| | | | |
|---|---|---|---|
| 11,483,350 B2* | 10/2022 | Bolignano | G06F 8/433 |
| 11,997,118 B1* | 5/2024 | Yawalkar | H04L 63/20 |
| 2018/0176257 A1* | 6/2018 | Kumar | G06N 3/08 |
| 2019/0207981 A1* | 7/2019 | Sweeney | H04L 41/145 |
| 2020/0364361 A1* | 11/2020 | Goyal | G06F 21/6209 |
| 2024/0022600 A1* | 1/2024 | Zhang | G06F 21/554 |
| 2025/0165616 A1* | 5/2025 | Cameron | G06F 21/552 |

* cited by examiner

Primary Examiner — Hadi S Armouche
(74) Attorney, Agent, or Firm — Van Pelt, Yi & James LLP

(57) ABSTRACT

The present application discloses a method, system, and computer system for managing policy configurations. The method includes (i) receiving a set of predefined security policy rules, (ii) determining, based at least in part on the set of predefined security policy rules, one or more security policy rules that do not satisfy one or more predefined requirements, (iii) performing a priority or position analysis to determine a relationship among a plurality of security policy rules, and (iv) providing a report pertaining to the one or more security policy rules.

20 Claims, 9 Drawing Sheets

| name | from_zone | source | user | to_zone | destination | application | service | action | urlcategory |
|---|---|---|---|---|---|---|---|---|---|
| R1 | ['trust'] | ['192.168.1.1'] | ['any'] | ['trust'] | ['192.168.101.1'] | ['any'] | ['tcp/80'] | allow | ['any'] |
| R2 | ['DMZ'] | ['10.20.30.40'] | ['any'] | ['untrust'] | ['168.169.1.2'] | ['any'] | ['udp/80'] | deny | ['any'] |
| R3 | ['trust'] | ['192.168.1.1'] | ['any'] | ['trust'] | ['192.168.101.1'] | ['any'] | ['tcp/81'] | allow | ['any'] |

| name | from_zone | source | user | to_zone | destination | application | service | action | urlcategory |
|---|---|---|---|---|---|---|---|---|---|
| R' | ['trust'] | ['192.168.1.1'] | ['any'] | ['trust'] | ['192.168.101.1'] | ['any'] | ['tcp/80'] | allow | ['any'] |
| R3 | ['DMZ'] | ['10.20.30.40'] | ['any'] | ['untrust'] | ['168.169.1.2'] | ['any'] | ['udp/80'] | deny | ['any'] |

CYBER TWIN OF NGFW FOR SECURITY POSTURE MANAGEMENT

BACKGROUND OF THE INVENTION

Firewalls are a widely used network security tool that regulates and controls traffic between networks based on a set of predefined security rules. However, managing and maintaining these rules can be a complex and time-consuming task, especially in large networks with multiple firewalls. The current state of the art in firewall management involves manual analysis of firewall rule sets, which is a labor-intensive and error-prone process. Additionally, the dynamic nature of network traffic and the ever-evolving threat landscape makes it challenging to keep up with the changing security requirement.

BRIEF DESCRIPTION OF THE DRAWINGS

Various embodiments of the invention are disclosed in the following detailed description and the accompanying drawings.

FIG. 6A illustrates a chart identifying properties for a set of security policy rules.

FIG. 6B illustrates a chart identifying properties for a consolidated set of security policy rules according to various embodiments.

DETAILED DESCRIPTION

Figure 1:
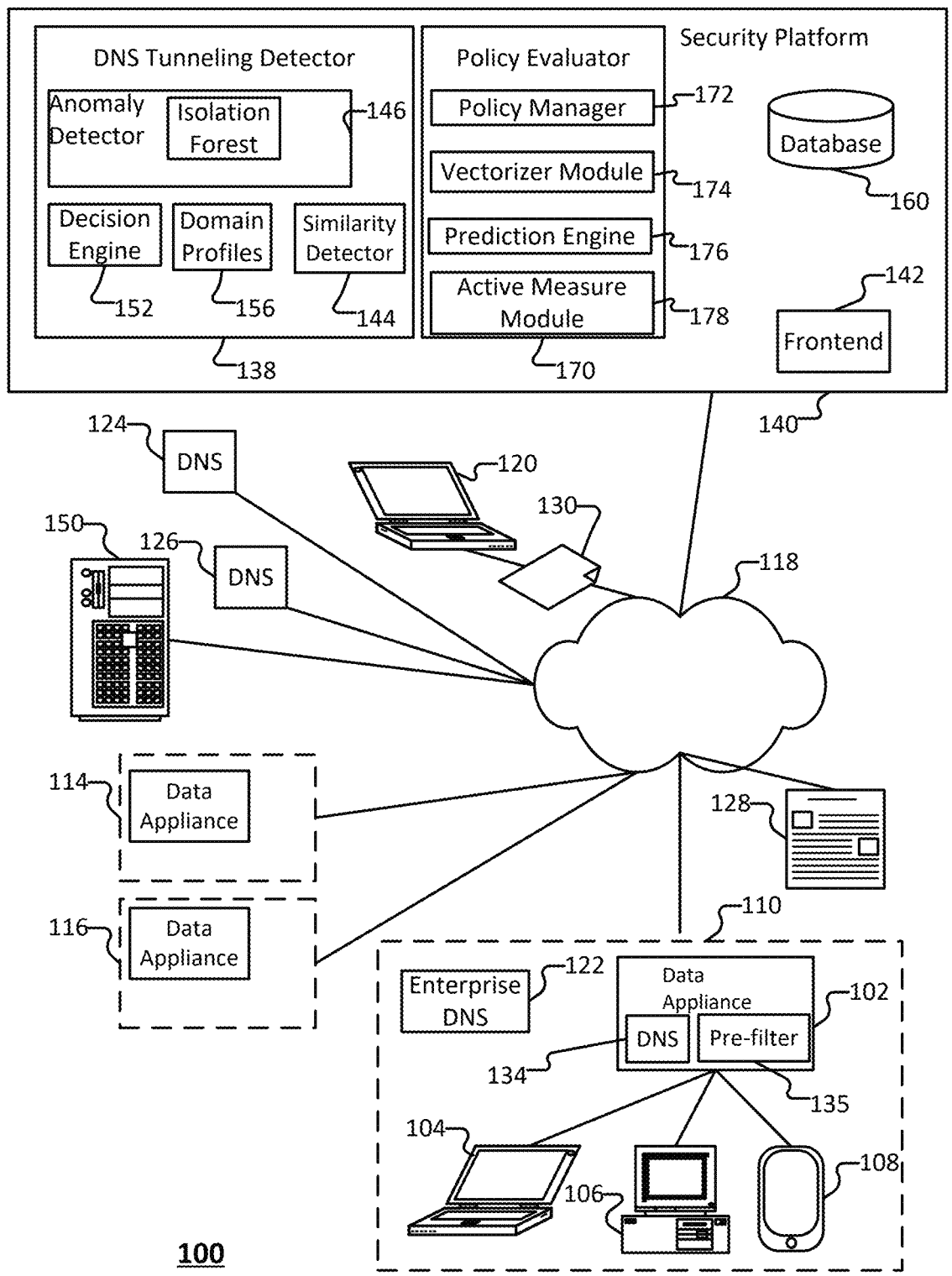
FIG. 1 is a block diagram of an environment for managing policy rules according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Related art systems for managing security policies provide an inadequate security posture. For example, misconfigurations of security policies account for about 99% of successful network breaches. The misconfigurations may arise from policy sprawl, accrued policy bloat, policy intent gaps, and/or human errors. Traditional related art systems are not effective mechanisms for scoping out optimization of security policies or a set of security policy rules.

Various embodiments aim to address the labor-intensive and error-prone process of related art systems by providing an automated system that analyzes security rules enforced by a firewall, identifies potential security risks, inconsistencies, and/or optimizations, and suggests optimization and improvement strategies. In some embodiments, the system uses advanced algorithms/processes and machine learning techniques to identify patterns and anomalies in firewall rule sets, and provide actionable insight to security administrators.

Various embodiments implementing the analysis of rulesets enforced by firewalls have potential application in a variety of industries, including cybersecurity, network management, and cloud computing. By streamlining the firewall management process and reducing the risk of security breaches/vulnerabilities, systems implementing various embodiments can help organizations to achieve better network security, compliance, and/or operational efficiency.

According to various embodiments, a method, system, and/or computer system for managing policy configurations are provided. The method includes (i) receiving a set of predefined security policy rules, (ii) determining, based at least in part on the set of predefined security policy rules, one or more security policy rules that do not satisfy one or more predefined requirements, (iii) performing a priority or position analysis to determine a relationship among a plurality of security policy rules, and (iv) providing a report pertaining to the one or more security policy rules.

As used herein, an insight may include one or more characteristics pertaining to a security policy rule(s) and/or one or more characteristics pertaining to a relationship among a plurality of security policy rules. Examples of characteristics pertaining to security policy rule that is provided by the insight include (i) an overlap analysis among a plurality of security policy rules (e.g., a determination of an overlap, or extent of an overlap, between at least two security policy rules), (ii) a similarity of a plurality of security policy rules (e.g., a determination of a degree of similarity or divergence between at least two security policy rules or at least two versions of a particular security policy rule), (iii) an equivalence analysis with respect to a plurality of security policy rules (e.g., a determination of the equivalence or the extent of equivalence between at least two security policy rules), (iv) a correlation analysis between/among a plurality of security policy rules (e.g., a determination of a consistency or contradiction between at least two security policy rules), and (v) an optimization analysis with respect to one or more security policy rules (e.g., an analysis of whether/how a plurality of security policy rules can be combined), etc.

As used herein, a policy rule object is a field or property of a security policy rule (or more generally of a security policy). A security policy rule can have a definition with respect to one or more objects. Examples of policy rule objects include: (i) a source address, (ii) a destination address, (iii) an application (e.g., an application identifier), (iv) an origin zone, (v) an interface, (vi) a profile, (vii) a user, etc. Various other policy rule objects and/or a set of objects for a given field may be implemented. As an example, system implements an evaluation of a security policy rule along one or more dimensions defined by a policy rule object to provide one or more insights with respect to the security policy rule or a policy rule object of the security policy rule.

As used herein, a security entity may include a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity. As another example, a security entity may be implemented as an application running on a device, such as an anti-malware application. As another example, a security entity may be implemented as an application running on a container or virtual machine.

In some embodiments, the system uses an analysis engine to evaluate a security policy rule(s) to provide an insight. As an example, the evaluation result of the evaluation of the security policy rule(s) includes an indication (e.g., measure, report) with respect to one or more of (i) policy hygiene (e.g., policy redundancy, contradiction, fragmentation, etc.), (ii) policy updates (e.g., policy sprawl or contradiction avoidance, impact on applications or connectivity, policy coverage), and (iii) policy optimization (e.g., consolidation of a plurality of security policies).

In some embodiments, the system evaluates one or more security policy rules. The system (i) receives a set of security policy rules, (ii) determines one or more security policy rules that do not satisfy an intent or contradict an intent; and (iii) performs a priority/position analysis to generate an intent/satisfaction result of the security policy rules to generate a final set of security policy rules.

The system comprises one or more evaluation engines that are configured to analyze a security policy or a security policy rule. Examples of evaluation engines include (i) a symbolic engine that analyzes the security policy/security policy rule based on vectors or representations generated by satisfiability modulo theories (SMT) encoders, and/or (ii) a machine learning (ML) model that analyzes the security policy/security policy rule based on vector or embeddings generated by a vectorizer. The evaluation engines impersonate the firewall behavior with respect to a security policy.

An ML evaluator engine may be implemented in connection with clustering or determining an affinity of security policies or security policy rules.

The symbolic engine is built from the security policy rules and associated objects. Each rule specifies whether to accept or reject an incoming network traffic (e.g., a packet of traffic).

In some embodiments, the system comprises an analytics engine that determines an evaluation result based on the results from the one or more evaluation engines. For example, the analytics engine determines an evaluation result with respect to a security policy or security policy rule based on an ensemble of the output from the symbolic evaluation engine and the output from the ML model.

The system may evaluate a security policy (or security policy rule) before deployment of the security policy rule to a security entity. For example, a user/system provides the security policy (or a security policy rule) to an evaluator to evaluate the security policy before being implemented at a firewall. The system may evaluate the security policy rule and provide insights with respect to the security policy and/or a recommendation(s) for modifying the security policy rule (or another security policy rule, such as to incorporate the intent of the new security policy rule, etc.).

The system may evaluate a security policy (or security policy rule) after deployment of the security policy to a security entity. Although developers/organizations may deem it more ideal to evaluate the security policy before deployment (e.g., to a provide prophylactic measure), such a priori evaluation may not be possible in all circumstances. Thus, the system may evaluate the security policy post-deployment. For example, the system may evaluate/analyze the security policy in response to the security policy being deployed or a user input requesting such evaluation. As another example, the system may evaluate/analyze the security policy at periodic intervals or continuously.

The security posture for a particular security policy or security policy rule depends on one or more of (i) an individual rule specification and its effectiveness, (ii) an order of rules in a ruleset, and (iii) an organization of rulesets.

In some embodiments, in connection with evaluating a set of security policy rules, the system determines whether an anomaly is inherent in the policy rules being evaluated. Examples of anomalies include (i) a shadowing anomaly, (ii) a redundancy anomaly, (iii) a correlation anomaly, (iv) a generalization anomaly, and (v) a consolidation. With respect to a shadowing anomaly, a rule is shadowed when a previous rule matches all the packets that match this rule (e.g., packets that are handled according to the rule), such that the shadowed rule will never be activated. With respect to a redundancy anomaly, a redundant rule performs the same action on the same packets as another rule such that if the redundant rule is removed, the security policy will not be affected. With respect to a correlation anomaly, two rules are correlated if the rules have different filtering actions, and the first rule in an order of rules matches some packets that match the second rule (e.g., at least a subset of packets invoked by each of the first rule and the second rule match). With respect to a generalization anomaly, a rule is a generalization of a preceding rule if the rules have different actions and if the first rule can match all the packets that match the second rule. A consolidation occurs when two rules have the same action (e.g., handle a matched packet in the same manner) and differ by a single attribute/object.

FIG. 1 is a block diagram of an environment for managing policy rules according to various embodiments. In some embodiments, system 100 is implemented at least in part by system 200 of FIG. 2 and/or system 300 of FIG. 3. In some embodiments, system 100 implements at least part of process 400 of FIG. 4, process 500 of FIG. 5, process 700 of FIG. 7, process 800 of FIG. 8, and/or process 900 of FIG. 9.

In the example shown, client devices 104-108 are a laptop computer, a desktop computer, and a tablet (respectively)

present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 can provide a variety of services, including classifying network traffic (e.g., identifying application(s) to which particular samples of network traffic corresponding), providing a mapping of signatures to applications/application identifiers (e.g., network traffic signatures to application identifiers), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, and providing an indication that an input string, file, or domain is malicious (or benign), evaluating one or more security policies or a set of security policy rules, determining an insight with respect to one or more security policy rules, performing an active measures, etc. In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix Xen-Server, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, policy evaluator 170 manages security policies or a set of security policy rules. Policy evaluator 170 may evaluate the security policy or security policy rules in connection with maintaining security policies or a set of security policy rules. For example, policy evaluator 170 may perform such an evaluation in response to obtaining a new or modified security policy or security policy rule. As another example, policy evaluator 170 performs such an evaluation according to a predefined interval/time period. As another example, policy evaluator 170 performs such an evaluation in response to a request from another system or service, such as from a user operating a client system. Policy evaluator 170 determines an evaluation result with respect to one or more insights pertaining to enforcement of a security policy or a set of security policy rules. In response to determining the evaluation result, policy evaluator 170 may report the evaluation result or recommend active measures to be implemented or cause an active measure to be implemented.

In some embodiments, system 100 (e.g., policy evaluator 170, security platform 140, etc.) trains one or more models to determine (e.g., predict) insights for a security policy or set of security policy rules. Examples of models include a symbolic prediction engine (e.g., an SMT solver), a ML prediction engine, etc. System 100 may train a model to determine an overlapping of security policy rules, determine contradicting security policy rules, an equivalence of a plurality of security policy rules, an optimization of a set of security policy rules, etc. System 100 performs a feature extraction and generates a set of representations (e.g., bitvectors, feature vectors, etc.) for training a model for evaluating the security policy/security policy rule to determine an insight. As an example, the representations represent the objects and relationships associated with a security policy rule. In some implementations, the representations represent all objects and relationships associated with the security policy. System 100 then uses the set of feature vectors to train a machine learning model such as based on training data that includes samples of network traffic for a set of applications.

In some embodiments, in connection with evaluating a set of security policy rules (or the enforcement thereof), policy evaluator 170 (i) receives a security policy or security policy rule(s), (ii) obtains information pertaining the security policy/security policy rule(s), (iii) determines a representation for the set of security policy rules (e.g., a bit vector, a feature vector, etc.), (iv) queries a model (e.g., an SMT prediction engine, an ML prediction engine, etc.) based on the representation, (v) determines an evaluation result for insights based on results/outputs from one or more models (e.g., creates a final evaluation result based on a combination/ensemble of the results from a plurality of models). In some embodiments, policy evaluator 170 determines the active measure mapped to a context corresponding to the evaluation result. For example, in response to determining that a plurality of security policy rules is overlapping (at least partially), policy evaluator 170 determines active measure for (e.g., mapped to) the context in which a plurality of security policy rules is overlapping.

In some embodiments, policy evaluator 170 comprises one or more of policy manager 172, vectorizer module 174, prediction engine 176, and/or active measure module 178.

Policy manager 172 is used in connection with receiving, storing and maintaining a security policy or a set of security policy rules. Policy manager 172 may receive a security policy rule definition from a user such as a network administrator for system 100. The definition of the security policy rule may indicate how to handle certain network traffic (e.g., traffic for a particular set of applications). The security policy may indicate a priority in which a set of security policy rules are to be enforced, a manner for resolving conflicts among the set of security policy rules, etc.

Vectorizer module 174 is used in connection with determining a representation (e.g., a low-dimensional representation) of a security policy rule or security policy. For example, vectorizer module 174 generates the representation according to a predefined algorithm/process, which may be based on the one or more prediction engines to be used to evaluate the security policy rule or security policy. The representation may be a feature vector, a bitvector, an integer representation, an enum representation, etc.

Prediction engine 176 is used in connection with evaluating the set of security policy rules or security policy for a particular insight (e.g., an insight requested by a user or other system/service). Prediction engine 176 determines an evaluation result for the insight based at least in part on the representation obtained by vectorizer module 174. For example, prediction engine 176 queries one or more prediction engines (e.g., models, such as an SMT solver or a ML model). In the case of a plurality of prediction engines being used to determine an evaluation result, prediction engine 176 may determine a final evaluation result (e.g., a combined or composite evaluation result) based at least in part on a combination or ensemble of the outputs of the plurality of prediction engines.

Active measure module 178 is used in connection with determining an active measure to be implemented or recommended with respect to the evaluated security policy or set of security policy rules. The active measure module 178 may query a mapping of contexts to active measures based on a context corresponding to the evaluation result (e.g., a mapping of a particular insight value/result to a particular active measure). In some embodiments, active measure module 178 is used to implement the active measure or to cause another system or service to implement the active measure.

According to various embodiments, in response to prediction engine 176 determining an evaluation result for an insight, system 100 modifies a security policy rule.

In some embodiments, security platform 140 receives one or more policies, such as from an administrator or third-party service, and provides the one or more policies to various network nodes, such as endpoints, security entities (e.g., inline firewalls), etc.

Returning to FIG. 1, suppose that a malicious individual (using client device 120) has created malware or malicious sample 130, such as a file, an input string, etc. The malicious individual hopes that a client device, such as client device 104, will execute a copy of malware or another exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. Security platform 140 (e.g., policy evaluator 170) may provide to the various security entities (e.g., client devices, data appliances, firewalls, etc.) a security policy or set of security policy rules to be enforced, such as a set of security policy rules modified based on an evaluation of an insight performed with respect to one or more security policy rules.

Figure 2:
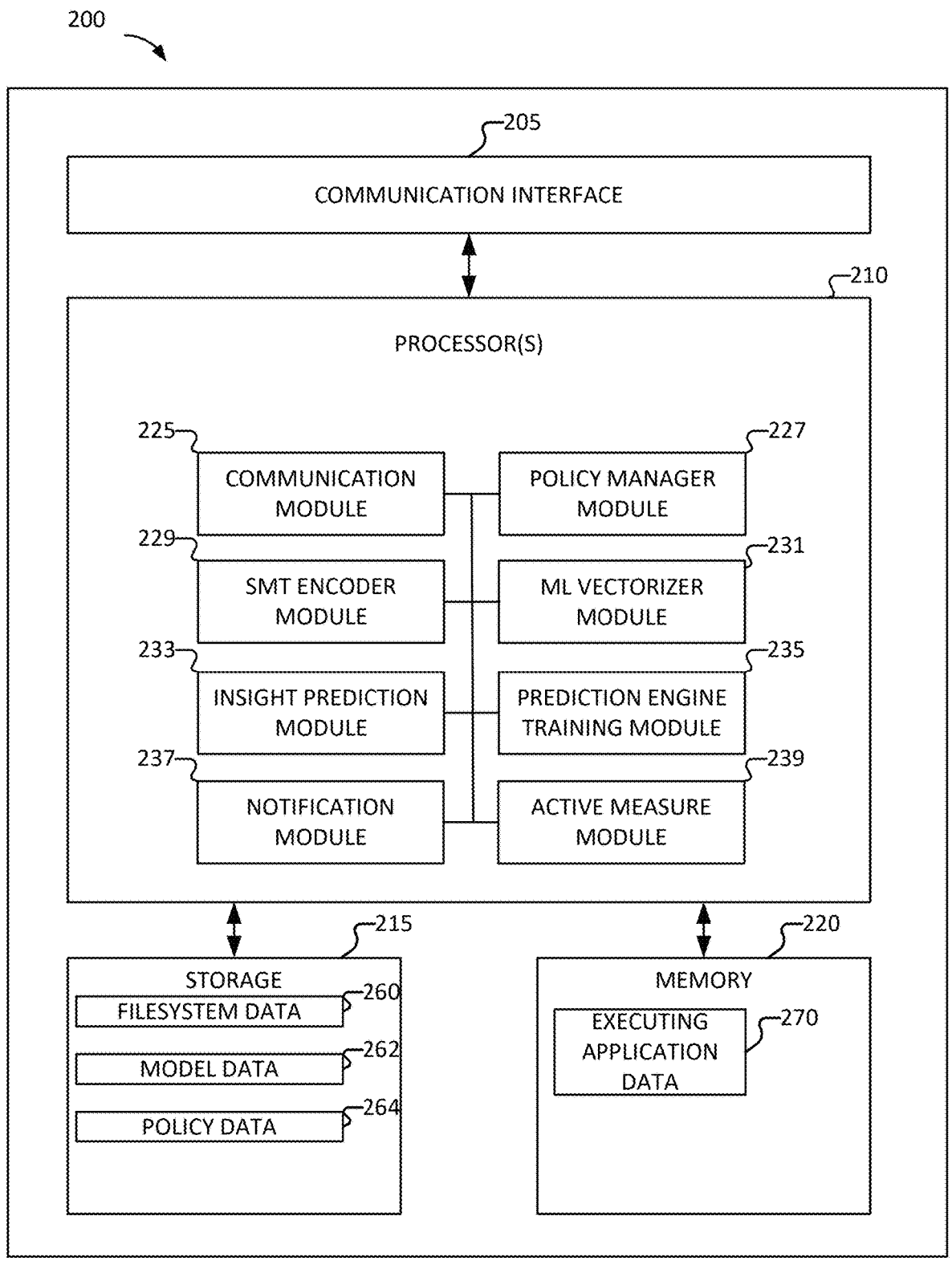
FIG. 2 is a block diagram of system for managing policy rules according to various embodiments.

FIG. 2 is a block diagram of system for managing policy rules according to various embodiments. In some embodiments, system 200 implements at least part of system 100 of FIG. 1 and/or system 300 of FIG. 3. In some embodiments, system 200 implements at least part of process 400 of FIG. 4, process 500 of FIG. 5, process 700 of FIG. 7, process 800 of FIG. 8, and/or process 900 of FIG. 9.

System 200 can be implemented by one or more devices such as servers. System 200 can be implemented at various locations on a network. In some embodiments, system 200 implements policy evaluator 170 of system 100 of FIG. 1. As an example, system 200 is deployed as a service, such as a web service (e.g., system 200 evaluates/validates a security policy or security policy rule). The service may be provided by one or more servers.

In some embodiments, system 200 (i) receives a set of security policy rules, (ii) determines one or more security policy rules that do not satisfy an intent or contradict an intent; and (iii) performs a priority/position analysis to generate an intent/satisfaction result of the security policy rules to generate a final set of security policy rules. System 200 can report out a result of the evaluation of the security policy or security policy rules. Additionally, or alternatively, system 200 can provide a recommendation for resolving an inconsistency in the security policy/security policy rule (e.g., to optimize a security policy such as via consolidating security policy rules, to resolve contradicting security policy rules such as rules that treat the same set of network traffic in different/opposing manners, etc.). System 200 may further implement an active measure (or cause an active measure to be implemented) to resolve the inconsistency.

In some embodiments, system 200 uses an ensemble of outputs/evaluation results from a plurality of engines to provide an insight with respect to a security policy or security policy rule. System 200 provides an insight based at least in part on one or more policy rule objects. For example, system 200 provides the insight along a dimension defined by at least one or more policy rule objects.

System 200 may be configured to evaluate a security policy/security policy rule before deployment/enforcement by a security entity. Additionally, or alternatively, system 200 is configured to perform periodic or continuous monitoring of the enforcement of the security policy/security policy rule.

In the example shown, system 200 implements one or more modules in connection with evaluating or validating a security policy or security policy rule, monitoring a security posture of a security entity, providing a notice or indication of whether an anomaly is created by a new or modified security policy or security policy rule, and/or performing an active measure, etc. System 200 comprises communication interface 205, one or more processors 210, storage 215, and/or memory 220. One or more processors 210 comprises one or more of communication module 225, policy manager module 227, SMT encoder module 229, ML vectorizer module 231, insight prediction module 233, prediction engine training module 235, notification module 237, and/or active measure module 239.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.) such as a report or other indications pertaining to an evaluation of a security policy/security policy rule. As another example, communication interface 205 provides to communication module 225 information received by system 200, such as security polices, security policy rules, requests to perform an evaluation of one or more security policies (e.g., to detect inefficiencies or potential optimizations), etc. Communication module 225 is configured to receive a definition for a security policy or security policy rule, an indication of one or more security policies/security policy rules to be evaluated (e.g., to assess whether rules are overlapping, inconsistent, etc.), such as from network endpoints or nodes such as security entities (e.g., firewalls), database systems, query systems, etc. Communication module 225 is configured to query third party service(s) for information pertaining to the applications or network traffic (e.g., services that perform an analysis of a security policy or a set of security policy rules, provide predictions of optimizations or anomalies with respect to security policy rules, etc.). For example, system 200 uses communication module 225 to query the third-party service(s). Communication module 225 may configured to receive one or more settings or configurations from an administrator. Examples of the one or more settings or configurations include configurations of one or more security policies to be enforced at a security endpoint, a process determining whether an application is permitted, malicious, benign, etc., a configuration of an engine (e.g., an SMT or symbolic engine, an ML engine/model), a format or process according to which a feature vector is to be determined, a set of feature vectors to be provided to a classifier for evaluating a security policy rule(s), a set of predefined signatures to be assessed or counted, information pertaining to a whitelist of domains or applications (e.g., applications that are not deemed suspicious or malicious), information pertaining to a blacklist of domains or applications (e.g., applications that are deemed to be suspicious or malicious and for which traffic is to be quarantined, deleted, or otherwise to be restricted from being executed/transmitted), etc.

In some embodiments, system 200 comprises policy manager module 227. System 200 uses policy manager module 227 to manage one or more security policies to be enforced at a security entity. Policy manager module 227 is configured to receive a definition/update for a security policy and store the security policy. Policy manager module 227 may further store an indication of relative priorities for a set of security policies/security policy rules. The priorities may be used to determine an order in which security policies/security policy rules are to be implemented, or to resolve conflicts between contradicting/incongruent security policy rules. In response to system 200 receiving an indication that a security policy/security policy rule is to be evaluated, policy manager module 227 may obtain the applicable security policy/security policy rule and provide the corresponding information to one or more other modules implemented by processor(s) 210. In some embodiments, system 200 uses policy manager module 227 to manage the evaluation/analysis of a security policy (e.g., a set of security policy rules).

In some embodiments, system 200 comprises SMT encoder module 229. System 200 uses SMT encoder module 229 to determine an insight(s) to be evaluated with respect to a security policy (e.g., a set of security policy rules). In response to determining the insight to be evaluated, SMT encoder module 229 determines the objects to be used in connection with evaluating the insight and obtains the objects for the corresponding security policy rule(s) (e.g., values for fields in the security policy rule). SMT encoder module 229 encodes the object information for objects to be used in connection with generating the insight. For example, SMT encoder module 229 generates a representation of the object information. The representation of object information is a low-dimensional representation. As an example, the representation of the object information comprises an enum, a bitvector, or an integer.

In some embodiments, system 200 comprises ML vectorizer module 231. System 200 uses ML vectorizer module 231 to determine an insight(s) to be evaluated with respect to a security policy (e.g., a set of security policy rules). In response to determining the insight to be evaluated, ML vectorizer module 231 determines the objects to be used in connection with evaluating the insight and obtains the objects for the corresponding security policy rule(s) (e.g., values for fields in the security policy rule). ML vectorizer module 231 encodes the object information for objects to be used in connection with generating the insight. For example, ML vectorizer module 231 generates a feature vector or embeddings representing the object information. The feature vector or embeddings representing the object information may comprise one or more of a global vector (GloVe), and a one-hot encoding. According to various embodiments, ML vectorizer module 231 is configured to generate a representation of object information based on various other encoding mechanisms.

In some embodiments, system 200 comprises insight prediction module 233. System 200 uses insight prediction module 233 to predict an insight with respect to a particular set of security policy rules. In some embodiments, insight prediction module 233 comprises one or more prediction engines. Examples of prediction engines include a symbolic prediction engine, a statistical prediction engine (e.g., a ML model), etc. Various other types of prediction engines may be implemented.

In some embodiments, insight prediction module 233 comprises statistical prediction engine. Examples of the statistical prediction engine include a clustering engine, etc. The clustering engine may implement various algorithms, such as K-Nearest-Neighbor (KNN), an artificial neural network (ANN), etc. to perform a clustering A plurality of statistical prediction engines may be implemented, such as to provide different insights or different aspects of a particular insight.

In some embodiments, insight prediction module 233 comprises a symbolic prediction engine. Examples of a symbolic prediction engine include a z3 SMT solver, a cvc5 SMT solver, a MathSAT SMT solver, etc. Various other solvers may be implemented. A plurality of symbolic prediction engines may be implemented, such as to provide different insights or different aspects of a particular insight.

In response to determining to evaluate a security policy or set of security policy rules, system 200 provides insight prediction module 233 with the representation of the information from the applicable objects of the security policy rule(s) (e.g., the objects used to evaluate the security policy rule for the insight). For example, system 200 provides to insight prediction module 233 a vector (e.g., a feature vector for an ML model, a bitvector for an SMT solver, etc.). In response to receiving the representation for the particular security policy rule(s) to be evaluated, insight prediction module 233 predicts an insight (e.g., an evaluation result) for the particular security policy rule(s) based at least in part on the representation. In some embodiments, insight prediction module 233 queries one or more prediction engines based on the representation (e.g., the vector representing the security policy rule). Insight prediction module 233 uses the prediction engine(s) to analyze the security policy rule(s) (e.g., the representation or vector such as a feature vector, bitvector, etc.) and generate an evaluation result for the desired insight.

In some embodiments, insight prediction module 233 determines an evaluation result for a desired insight based on outputs (e.g., results) from a plurality of prediction engines. For example, insight prediction module 233 uses a symbolic prediction engine (e.g., an SMT solver) and a ML prediction engine to generate results used to determine the insight. Insight prediction module 233 determines the evaluation result for the insight based on an ensemble of results from a plurality of prediction engines. As an example, with respect to performing an intent satisfaction analysis (e.g., to provide guidance to a user on how a new rule/intent can be added to existing rules), insight prediction module 233 uses an SMT solver to determine security policy rules satisfying the desired intent or rules contradicting the desired intent, and then uses an ML prediction engine (e.g., a ML model to perform clustering) to perform a position/priority analysis to obtain the evaluation result to provide the insight.

In some embodiments, system 200 comprises prediction engine training module 235. System 200 uses prediction engine training module 235 to train the various prediction engines comprised in insight prediction module 233. For example, prediction engine training module 235 implements a machine learning process to train one or more machine learning models. As another example, prediction engine training module 235 implements one or more training processes to train a symbolic prediction engine such as an SMT solver.

Examples of machine learning processes that can be implemented in connection with training the classifier(s)/prediction engine include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, multi-view clustering, graph neural networks (GNN), etc. As an example, prediction engine training module 235 inputs the feature vector (e.g., the TF-IDF feature vector) to the classifier (e.g., the KNN machine learning classifier model) to determine a predicted insight. The classifier provides a predicted classification (e.g., a machine learning-based predicted classification), such as a predicted application identifier for an application expected to (e.g., deemed most likely to) correspond to the network traffic or a prediction of one or more of: (i) an overlap analysis among a plurality of security policy rules (e.g., a determination of an overlap, or extent of an overlap, between at least two security policy rules), (ii) a similarity of a plurality of security policy rules (e.g., a determination of a degree of similarity or divergence between at least two security policy rules or at least two versions of a particular security policy rule), (iii) an equivalence analysis with respect to a plurality of security policy rules (e.g., a determination of the equivalence or the extent of equivalence between at least two security policy rules), (iv) a correlation analysis between/among a plurality of security policy rules (e.g., a determination of a consistency or contradiction between at least two security policy rules), and (v) an optimization analysis with respect to one or more security policy rules (e.g., an analysis of whether/how a plurality of security policy rules can be combined), etc.

Examples of processes that can be implemented in connection with training the symbolic classifier(s)/prediction engine include (i) empirical training (e.g., a data-driven approach where a set of labeled input-output examples is used to train a machine learning model), (ii) symbolic execution (e.g., a technique where a program is executed with symbolic inputs instead of concrete values, such as through execution of a process to generate a set of constraints used solve a formula), (iii) incremental solving (e.g., maintaining an internal state and incrementally updating the solver as new formulas are added), (iv) parallelization (e.g., splitting the solving process into multiple threads or processes that can be executed simultaneously), and (v) heuristic optimization (e.g., a solver uses heuristics or rules of thumb to guide the search for a solution). Various other types of training processes may be implemented.

In some embodiments, prediction engine training module 235 trains the models based on a training set. The training set may comprise one or more of a set of security policy rules.

In some embodiments, system 200 comprises notification module 237. System 200 uses notification module 237 to provide an indication of the insight, such as a report for the evaluation result for evaluating the security policy rule(s) to generate the insight (e.g., a report indicating overlapping security policy rules, contradicting or inconsistent security policy rules, redundant security policy rules. Notification module 237 provides the indication (e.g., the report) to another system or service, such as a client system (e.g., used by a developer that defines security policy rules) or an administrator system (e.g., used by a network administrator while evaluating a security policy posture, etc.). Notification module 237 may also provide an indication of an active measure to be implemented or a recommendation for an active measure to be implemented (e.g., a recommendation to consolidate multiple security policy rules for the same intent into a single security policy rule, a recommendation to resolve contradicting security policy rules, etc.).

In some embodiments, system 200 comprises active measure module 239. System 200 uses active measure module 239 to determine an active measure to recommend or implement based on the evaluation result. System 200 may store, or have access to, a mapping of contexts to active measures. The contexts may correspond to evaluation result for an insight such as overlapping security policy rules, an extent of a similarity between a set of security policy rules, an equivalence of a set of security policy rules, an extent of a correlation between a plurality of security policy rules, a redundancy between a plurality security policy rules, a value of a policy rule, etc. In response to system 200 determining an evaluation result, active measure module 239 may query the mapping of contexts to active measures to determine the active measure to be implemented. Examples of active measures may include generating an alert/notification of an evaluation result, generating and providing a recommendation for (i) modifying a security policy rule, (ii) consolidating a set of security policies, (iii) deleting a security policy rule, etc. Various other active measures may be implemented/recommended.

In some embodiments, active measure module 239 implements the active measure. As an example, active measure module 239 causes the active measure to be implemented, such as by system 200 (e.g., another module in system 200) or another system/service.

According to various embodiments, storage 215 comprises one or more of filesystem data 260, model data 262, and/or policy data 264. Storage 215 comprises a shared storage (e.g., a network storage system) and/or database data, and/or user activity data.

In some embodiments, filesystem data 260 comprises a database such as one or more datasets (e.g., one or more datasets for security policies, etc.).

Model data 262 comprises information pertaining to one or more models used to predict an insight with respect to one or more security policies or security policy rules. As an example, model data 262 stores an ML model used in connection performing a priority/position analysis with respect to a set of security policy rules. As another example, model data 262 stores an SMT solver. Model data 262 comprises a representation of a policy rule object, such as a bitvector, a feature vector, etc. that may be generated with respect to one or more policy rule objects or security policy rules. In some embodiments, model data 262 comprises a combined feature vector that is generated based at least in part on one or more feature vectors corresponding to the network traffic (e.g., one or more samples of the network traffic) or a set of security policy rules.

Policy data 264 stores one or more security policies or a definition of a set of security policy rules to be enforced in connection with the security policy. In some embodiments, policy data 264 includes information indicating how historical network traffic was handled based on enforcement of a security policy or a particular security policy rule.

According to various embodiments, memory 220 comprises executing application data 270. Executing application data 270 comprises data obtained or used in connection with executing an application such as an application executing a hashing function, an application to extract information from webpage content, an input string, an application to extract information from a file, or other sample, etc. In embodiments, the application comprises one or more applications that perform one or more of receive and/or execute a query or task, manage security policies, analyze a set of policies, generate a report and/or configure information that is responsive to an executed query or task, and/or provide to a user information that is responsive to a query or task.

Figure 3:
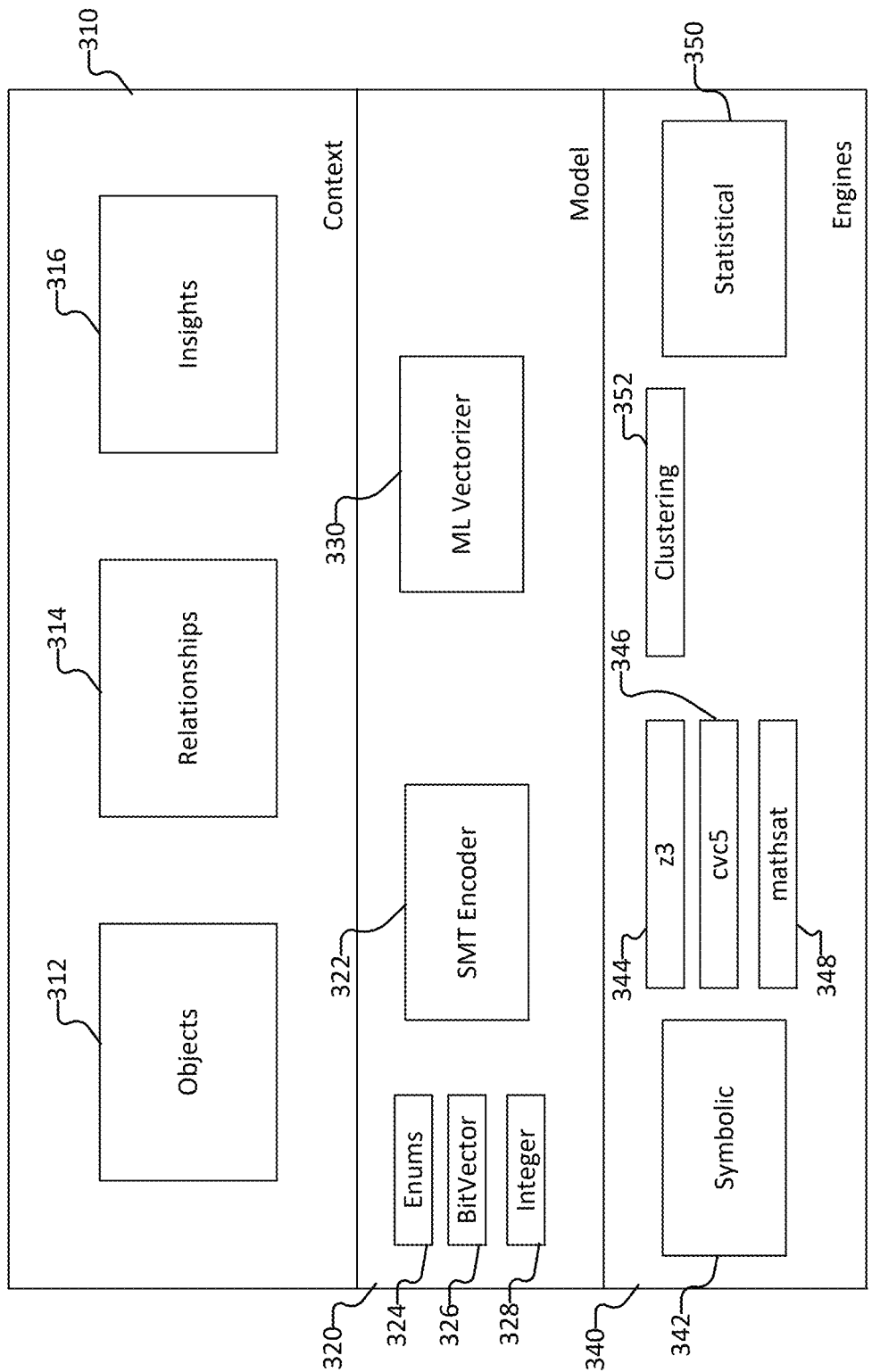
FIG. 3 is an example of a system for evaluating policy rules according to various embodiments.

FIG. 3 is an example of a system for evaluating policy rules according to various embodiments. In some embodiments, system 300 implements at least part of system 100 of FIG. 1 and/or system 200 of FIG. 2. In some embodiments, system 300 implements at least part of process 400 of FIG. 4, process 500 of FIG. 5, process 700 of FIG. 7, process 800 of FIG. 8, and/or process 900 of FIG. 9.

In the example shown, system 300 comprises a plurality of layers, such as context layer 310, model layer 320, and engine layer 340.

Context layer 310 is used to define a context associated with a security policy or a set of security policy rules. Context layer 310 may include one or more of objects 312, relationships 314, and/or insights 316.

In some embodiments, objects 312 includes one or more policy rule object definitions. For example, objects 312 comprises a definition for one or more of (i) a source address, (ii) a destination address, (iii) an application (e.g., an application identifier), (iv) a zone, (v) an interface, (vi) a profile, (vii) a user, etc. Various other policy rule objects may be implemented. System 300 (e.g., context layer 310 or objects 312) may store a value for the policy rule objects defined with respect to a particular security policy or security policy rule.

In some embodiments, relationships 314 includes one or more rule definitions. For example, relationships 314 comprises a definition for one or more of (i) security rules, (ii) network address translation (NAT) rules, (iii) decryption rules, (iv) filters (e.g., network traffic filters, etc.), etc. Various other rule definitions may be implemented. The rule definition(s) comprised in relationships 314 may correspond to rules that are to be enforced in accordance with a security policy. For example, a filter comprised in relationships 314 may indicate certain network traffic (e.g., traffic for a particular application(s)) that is to be forwarded to the endpoint or otherwise passed through the security entity or network traffic that is to be blocked by the security endpoint.

In some embodiments, insights 316 include one or more insight definitions. The insight definitions define the various insights for which system 300 evaluates the security policy or set of security policy rules.

Model layer 320 sits under context layer 310 and comprises one or more models that are used in connection with evaluating the security policy or set of policy rules based on objects 312 and/or relationships 314 to determine an evaluation result for one or more insights comprised in insights 316. Model layer 320 may comprise a plurality of models within which at least one subset of the models is a different type of model than another subset of the models. For example, model layer 320 may include an SMT solver and a ML model. In the example shown, model layer 320 comprises SMT encoder 322 and/or ML vectorizer 330.

SMT encoder 322 is used to encode information pertaining to a security rule or set of security policy rules. For example, SMT encoder 322 encodes the values for the one or more policy rule objects (e.g., comprised in objects 312) invoked by a particular rule/relationship (e.g., comprised in relationships 314) to provide a particular insight (e.g., comprised in insights 316). SMT encoder may comprise (and use in connection with encoding the information) one or more encoding mechanisms, such as enums 324 to generate an enum representation, BitVector 326 to generate a bitvector representation, and/or integer 328 to generate an integer representation.

ML vectorizer 330 is used to encode or vectorize information pertaining to a security rule or set of security policy rules. For example, ML vectorizer 330 generates a vector (e.g., a feature vector) based at least in part on the values for the one or more policy rule objects (e.g., comprised in objects 312) invoked by a particular rule/relationship (e.g., comprised in relationships 314) to provide a particular insight (e.g., comprised in insights 316). The vector is used in connection with querying an ML model to generate a prediction of an evaluation result (e.g., an insight prediction).

In connection with evaluating the security policy or set of security policy rules, system 300 uses a prediction engine in engine layer 340 to generate an evaluation result for an insight based on a representation (e.g., a feature vector, a bitvector, etc.) generated at model layer 320. Engine layer 340 comprises one or more predictive engines. In the case that engine layer 340 comprises a plurality of predictive engines, the plurality of predictive engines may comprise one or more types of predictive engines, such as a symbolic predictive engine, a statistical predictive engine, a simulation engine, to perform a constrained simulation such as to predict how certain packets/network traffic is to be handled according to the security policy rule(s)). In the example shown, engine layer 340 comprise symbolic predictive engine 342 and/or statistical predictive engine 350.

Symbolic predictive engine 342 performs an evaluation of a security policy or set of security policy rules using one or more SMT solvers. Examples of SMT solvers include z3 solver 344, cvc5 solver 346, and/or mathsat solver 348. Various other types of SMT solvers may be implemented. The SMT solver(s) uses the representation(s) generated by SMT encoder 322 to evaluate the security policy or set of security policy rules, such as to generate an insight evaluation result or in connection with generating the insight evaluation result.

Statistical predictive engine 350 performs an evaluation of a security policy or set of security policy rules using one or more ML models. Examples of ML models include clustering model 352. Various other types of ML models may be implemented. The ML model(s) uses the representation(s) generated by ML vectorizer 330 to evaluate the security policy or set of security policy rules, such as to generate an insight evaluation result or in connection with generating the insight evaluation result. Some systems comprise a high thousands number of rules, which may cause pairwise analysis of the rules to be inefficient and non-scalable. Various embodiments implement machine learning clustering techniques to identify closely associated rules (or clusters). Various embodiments then implement a detailed pairwise analysis for the identified closely associated rules (e.g., the rules in the cluster(s)).

Figure 4:
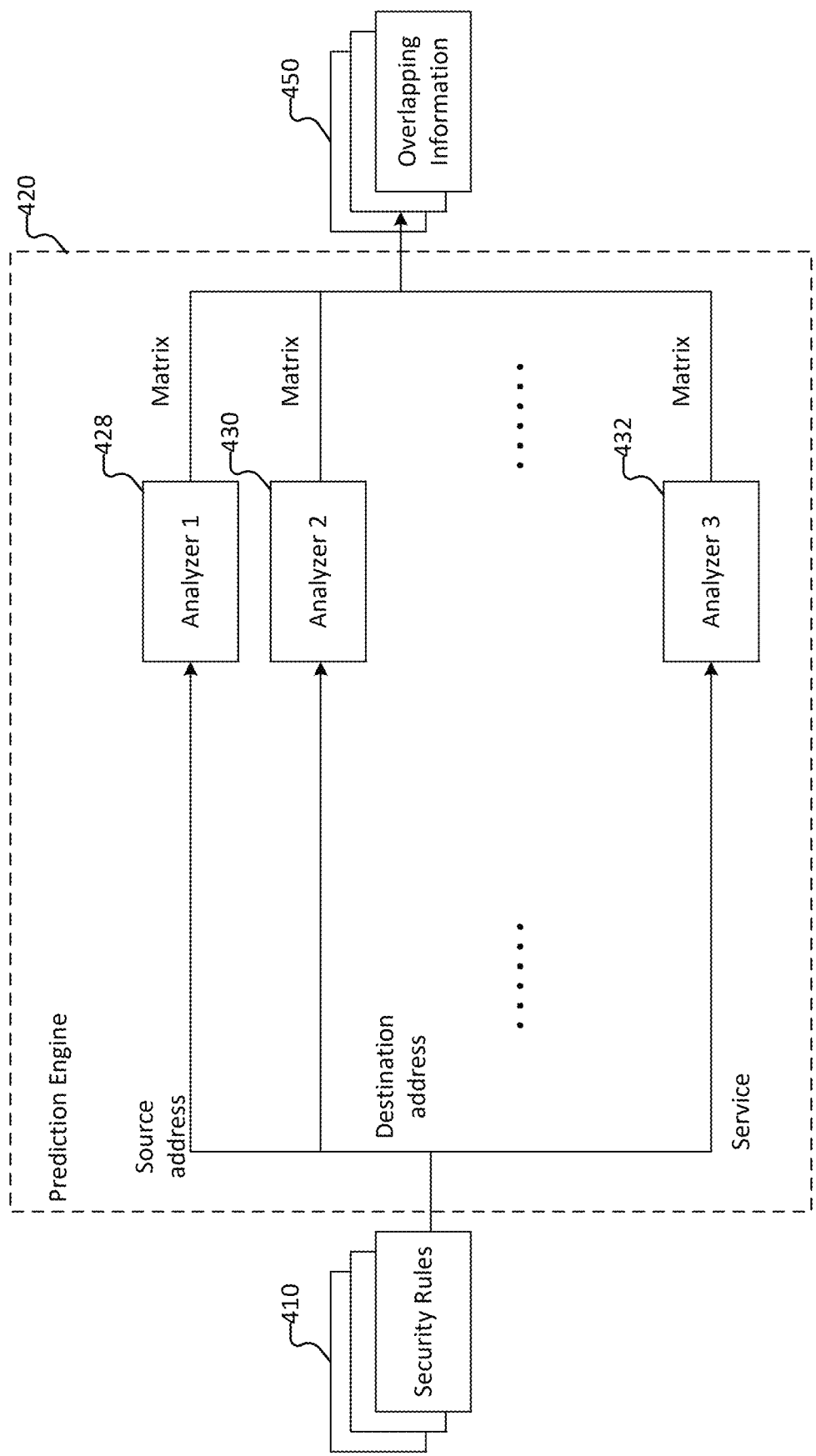
FIG. 4 is an example of a process for evaluating policy rules in connection with determining an overlap between rules according to various embodiments.

FIG. 4 is an example of a process for evaluating policy rules in connection with determining an overlap between rules according to various embodiments. In some embodiments, process 400 is implemented by system 100 of FIG. 1, system 200 of FIG. 2, and/or system 300 of FIG. 3.

In the example shown, process 400 uses a prediction engine in connection with determining whether a set of security policy rules overlap and/or an extent to which the set of security policy rules overlap. At 410, a set of security policy rules to be evaluated (e.g., security policy rules for which an overlapping is to be evaluated) are identified and provided to the prediction engine for evaluation. At 420, the prediction engine receives the security policy rules to be evaluated and analyzes the set of security policy rules to evaluate the overlapping of the set of security policy rules. At 450, information pertaining to an overlapping of the set of security policy rules is obtained from the prediction engine. The information pertaining to an overlapping may include one or more of (i) an indication of whether the set of security policy rules overlap, (ii) an extent to which the set of security policy rules overlap, (iii) a manner by which the set of security policy rules overlap (e.g., the specific parts of the security policy rules that overlap), and/or (iv) a recommendation for modifying the security policy or set of security policy rules based on whether/how the security policy rules overlap.

At 420, prediction engine performs 422-432.

The system may extract information for the policy rule objects (e.g., information from the fields of the security policy rule) from the security policy rule and provide such information to the analyzers. For example, information pertaining to a source address defined in the security policy rules is provided to analyzer 1 at 428, information pertaining to a destination address defined in the security policy rules is provided to analyzer 2 at 430, and information pertaining to a service defined in the security policy rules is provided to analyzer 3 at 432. Various other policy rule objects may be implemented (e.g., as defined by the security policy rule)

and the corresponding value/information for such objects are respectively provided to a corresponding analyzer.

At 428, 430, and 432, the prediction engine analyzes the extracted information for the policy rule objects. For example, the system (e.g., the prediction engine) uses a set of analyzers to obtain the information indicating whether/how the security policy rules overlap. The system obtains an analysis result to determine what security policy rule overlaps with another security policy rule based at least in part on the particular policy rule object (e.g., at 422, the analysis of the overlapping is based on the source address field/object). As an example, the analyzer may generate a matrix indicating whether a set of security policy rules overlap.

In some embodiments, the prediction engine obtains the output from each analyzer and generates a matrix indicating whether the security policy rules overlap on all policy rule objects. For example, if the matrix indicates that two security policy rules overlap, then all policy rule objects/fields of the security policy rule are overlapping.

In some embodiments, security policy rules are deemed to be overlapping of the security policy rules overlap on all the policy rule objects of the security policy rules. In some embodiments, security policy rules are deemed to be correlated if the security policy rules overlap on at least a subset of the policy rule objects of the security policy rules.

In some embodiments, the system computes pairwise overlapping information between security policy rules. In connection with computing the pairwise overlapping information, the system uses interval/set theory to determine exact overlap computations. For example, the system uses one or more SMT solvers to determine the overlapping of security policy rules. The system uses a ML model to perform clustering in connection with pruning the non-overlapping security policy rules, such as to reduce the computation resources required to assess or identify the overlapping security policy rules.

Figure 5:
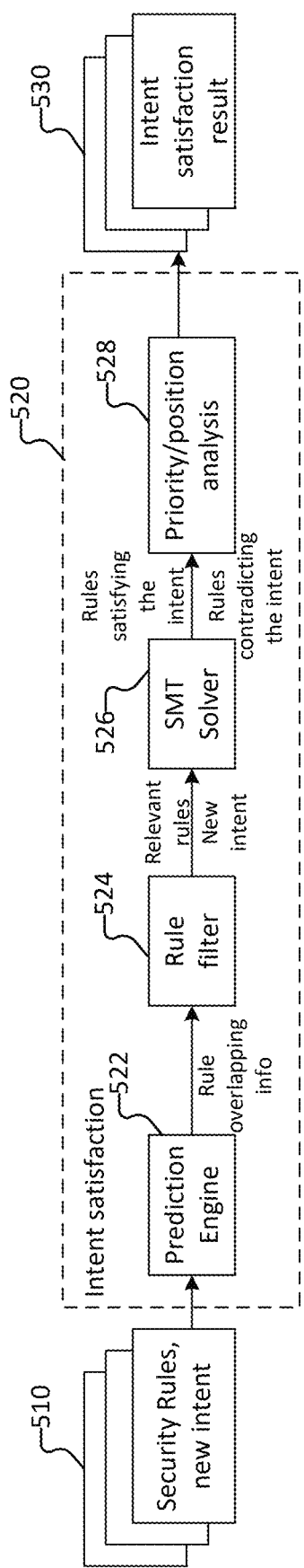
FIG. 5 is an example of a process for evaluating policy rules in connection with determining a subset of policy rules that satisfy an intent according to various embodiments.

FIG. 5 is an example of a process for evaluating policy rules in connection with determining a subset of policy rules that satisfy an intent according to various embodiments. In some embodiments, process 500 is implemented by system 100 of FIG. 1, system 200 of FIG. 2, and/or system 300 of FIG. 3.

In the example shown, process 500 uses an intent satisfaction engine in connection with evaluating a relationship between (i) a new security policy rule or corresponding intent and (ii) a set of predefined security policy rules (e.g., existing security policy rules) or corresponding predefined intents. The intent satisfaction provides guidance (e.g., to network administrators, etc.) on how a security policy rule can be added to a set of existing security policy rules enforced by a security policy in order to satisfy a particular intent. If there are no overlaps between security policy rules, then no further action is needed, and the new security policy rule may be implemented. If some existing security policy rules cover most of the new intent to be added, then the system may determine that the set of existing security policy rules may be modified to accomplish the new intent. For example, the system may provide a recommendation of a manner by which the security policies may be modified to accomplish the new intent. If the existing security rules do not cover most of the new intent to be added, the system may indicate that a new security policy rule is to be implemented to satisfy the new intent (e.g., rather than modifying one or more existing security policy rules). As an example, two rules can be consolidated if the rules differ on only one dimension and are close to each other in priority order. If the new intent's position is determined to be close to existing rule (above/below), the system may perform an analysis to check if consolidation can be achieved.

In some embodiments, the system provides guidance (e.g., to users such as network administrators) on how a new intent or security policy rule can be added to existing security policy rules. In connection with performing the intent satisfaction analysis, the system uses a prediction engine (e.g., the prediction engine described in connection with FIG. 4) to filter out security policy rules irrelevant to the new intent (e.g., security policy rules for which there is no correlation). In response to identifying/obtaining the security policy rules that are relevant to the new intent, the system uses SMT solvers (e.g., symbolic prediction engines) to determine security policy rules satisfying the new/desired intent or security policy rules that contradict the new/desired intent. In response to obtaining the security policy rules satisfying the new/desired intent or security policy rules that contradict the new/desired intent, the system performs a priority/position analysis to obtain an evaluation result pertaining to intent satisfaction among a set of existing security policies and a new intent or security policy rule. As an example, the system implements an ML prediction engine to perform the priority/position analysis.

At 510, the system obtains a set of security policy rules (e.g., the existing security policy rules) and a new security policy rule or a new intent and provides information pertaining to the security policy rules or new security policy rules or intent to an intent satisfaction engine. At 520, the intent satisfaction engine receives the information pertaining to the security policy rules or new security policy rules or intent, and the intent satisfaction engine analyzes such information to determine an evaluation result for the intent satisfaction. At 530, the system receives (e.g., as an output from the intent satisfaction engine) information pertaining to the intent satisfaction of the set of security policy rules vis a vis the new intent. The system may provide a corresponding evaluation result for the intent satisfaction analysis.

At 520, the intent satisfaction engine performs 522-528.

At 522, the intent satisfaction engine provides the new security policy rule/intent and the set of existing security policy rules to a prediction engine to obtain policy rule overlapping information. In some embodiments, 522 invokes process 400 to determine information indicating whether/how the security policy rules and new intent or new security policy rule overlap.

At 524, the intent satisfaction engine obtains the policy rule overlapping information from the prediction engine and provides such information to a rule filter to filter out irrelevant security policy rules, such as security policy rules that do not overlap or that are not correlated (e.g., are completely non-overlapping or the extent to which the security policy rules and the new intent overlap is less than a predefined overlapping threshold). In some embodiments, the system filters out security policy rules deemed to be non-relevant (e.g., security policy rules that are non-overlapping, or non-correlated) because evaluating a relatively large number of security policy rules via an SMT solver. As an example, security policies can have a number of security policy rules on the order of thousands or tens of thousands.

At 526, the intent satisfaction engine provides the relevant security policy rules and the new intent (or new security policy rule) to a symbolic prediction engine, which includes one or more SMT solvers. The one or more SMT solvers determine one or more of (i) the security policy rules satisfying the new intent, and (ii) the security policy rules contradicting the new intent.

The intent satisfaction evaluation is a set containment problem. Accordingly, the system encodes the set containment problem as a SMT problem to be solved by an SMT solver. As an example, the SMT solver evaluates the set containment problem and determines/provides all the relevant rules that satisfy the new intent (e.g., the action is same as the security policy rule being added). In addition, SMT solver determines/provides all the security policy rules that contradict the new intent or security policy rule.

At 528, the intent satisfaction engine provides to a priority/position analysis engine the information pertaining to one or more of (i) the security policy rules satisfying the new intent, and (ii) the security policy rules contradicting the new intent. The priority/position analysis engine (e.g., an ML predictive engine, such as a ML model used to cluster the information) performs a priority or position analysis to determine an evaluation result for the intent satisfaction.

FIG. 6A illustrates a chart identifying properties for a set of security policy rules. In the example shown, security policy rules definition 600 provides a definition of security policy rules R1, R2, R3. In some embodiments, the system uses the prediction engine(s) to determine an overlapping of security policy rules across security policy rules R1, R2, R3. In connection with performing an overlap analysis of the security policy rules, the system determines whether any two rules can be consolidated.

In some embodiments, two security policy rules Rx and Ry can be consolidated if: (i) Rx and Ry only differ in one policy object rule or field, (ii) Rx and Ry have the same action (e.g., have the same intent or treat the network traffic in the same manner, etc.), and/or (iii) the rules between Rx and Ry (e.g., with respect to order in which the policy rules are enforced) have no overlapping with Ry.

FIG. 6B illustrates a chart identifying properties for a consolidated set of security policy rules according to various embodiments. In the example shown, security policy rules definition 650 provides a definition of security policy rules R' and R3. In some embodiments, the system determines that R1 and R3 can be consolidated into R7', which is used to replace both R1 and R3.

Figure 7:
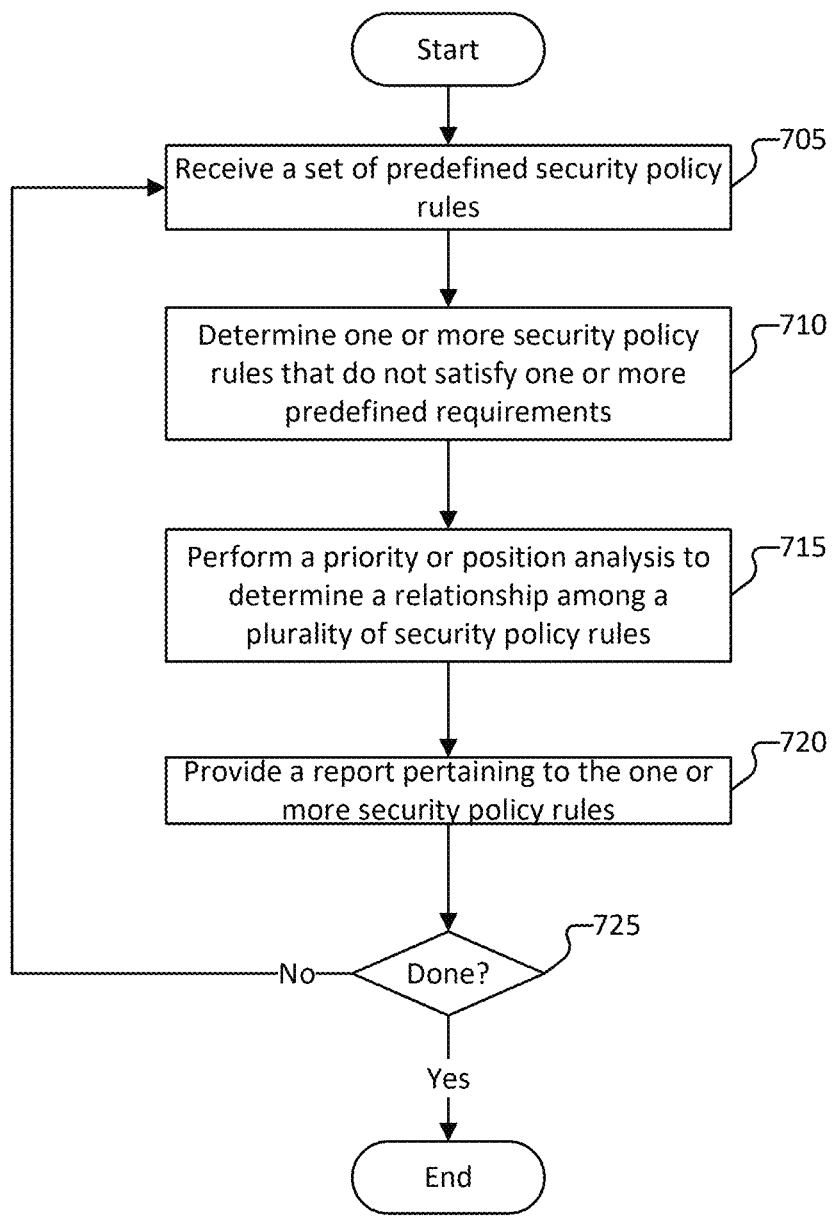
FIG. 7 is a flow diagram of a method for performing a priority or position analysis with respect to a plurality of policy rules according to various embodiments.

FIG. 7 is a flow diagram of a method for performing a priority or position analysis with respect to a plurality of policy rules according to various embodiments. In some embodiments, process 700 is implemented by system 100 of FIG. 1, system 200 of FIG. 2, and/or system 300 of FIG. 3.

At 705, a set of predefined security policy rules is received. At 710, the system determines one or more security policy rules that do not satisfy one or more predefined requirements. For example, in the context of performing an overlapping analysis or an intent satisfaction analysis, the system determines security policy rules that are not overlapping or that are otherwise deemed non-relevant (e.g., non-relevant with respect to a new intent to be introduced to a security policy). At 715, a priority or position analysis is performed to determine a relationship among a plurality of security policy rules. In some embodiments, the system implements an ML prediction engine to perform a clustering or priority/position analysis among the set of security policy rules. At 720, a report pertaining to the one or more security policy rules is provided. In some embodiments, the system provides the report to another system or service. For example, the system provides the report to a client system associated with a user to provide insight into the relationship among the plurality of security policy rules. As another example, the system provides the report to another system/service that is used to implement an active measure with respect to a particular security policy rule based at least in part on the report. At 725, a determination is made as to whether process 700 is complete. In some embodiments, process 700 is determined to be complete in response to a determination that no further policy rules are obtained, no further policy rules are to be validated or evaluated, the process has terminated, an administrator indicates that process 700 is to be paused or stopped, etc. In response to a determination that process 700 is complete, process 700 ends. In response to a determination that process 700 is not complete, process 700 returns to 705.

Figure 8:
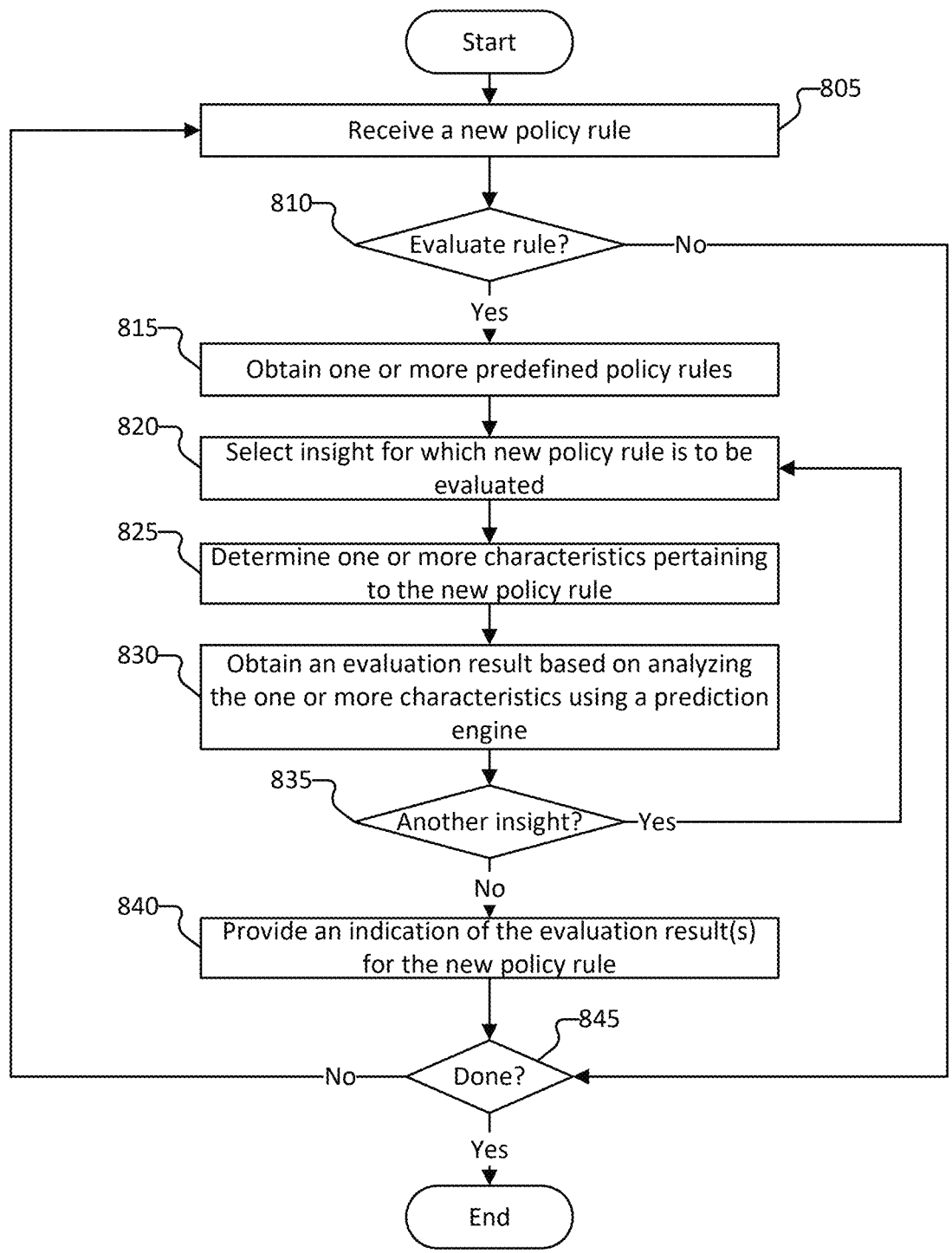
FIG. 8 is a flow diagram of a method for evaluating a policy rule according to various embodiments.

FIG. 8 is a flow diagram of a method for evaluating a policy rule according to various embodiments. In some embodiments, process 800 is implemented by system 100 of FIG. 1, system 200 of FIG. 2, and/or system 300 of FIG. 3.

At 805, a new policy rule is received.

At 810, the system determines whether to evaluate the rule. For example, the system determines whether the system receives a request to evaluate the rule. As another example, the system determines to evaluate the rule based on a policy indicating that evaluations are to be performed when new policy rules are defined/introduced. In response to determining that the policy rule is to be evaluated, process 800 proceeds to 815. Conversely, in response to determining that the policy rules it not to be evaluated, process 800 proceeds to 840.

At 815, one or more predefined rules are obtained.

At 820, the system selects an insight for which the new policy rule is to be evaluated. At 825, the system determines one or more characteristics pertaining to the new policy rule. In some embodiments, the determining one or more characteristics pertaining to the new policy rule includes vectorizing the one or more characteristics. For example, the system generates a vector. System may use an SMT encoder or an embedding of a machine learning model (e.g., a module that determines a feature vector corresponding to the new policy rule (e.g., at least with respect to the selected insight).

At 830, the system uses a prediction engine obtains an evaluation result based at least in part on analyzing the one or more characteristics. In some embodiments, the system queries the prediction engine using a vector associated with the one or more characteristics. For example, the system queries a machine learning model using a feature vector obtained by analyzing the policy rule(s). In some embodiments, the system implements a combination of a symbolic prediction engine(s) (e.g., an SMT solver) and a statistic prediction engine(s) (e.g., an ML prediction engine).

At 835, the system determines whether the policy rule(s) is to be evaluated with respect to another insight. In response to determining that an evaluation is to be performed with respect to (e.g., in the context of) another insight, process 800 returns to 820 and iterates over 820-835 until no further insights are to be provided (e.g., no further evaluations in the context of other insights is to be provided). In response to determining that no further insights are to be provided, process 800 proceeds to 840.

At 840, the system provides an indication of the evaluation result(s) for the new policy rule.

At 845, a determination is made as to whether process 800 is complete. In some embodiments, process 800 is determined to be complete in response to a determination that no further policy rules are obtained, no further policy rules are to be validated or evaluated, the process has terminated, an administrator indicates that process 800 is to be paused or stopped, etc. In response to a determination that process 800 is complete, process 800 ends. In response to a determination that process 800 is not complete, process 800 returns to 805.

Figure 9:
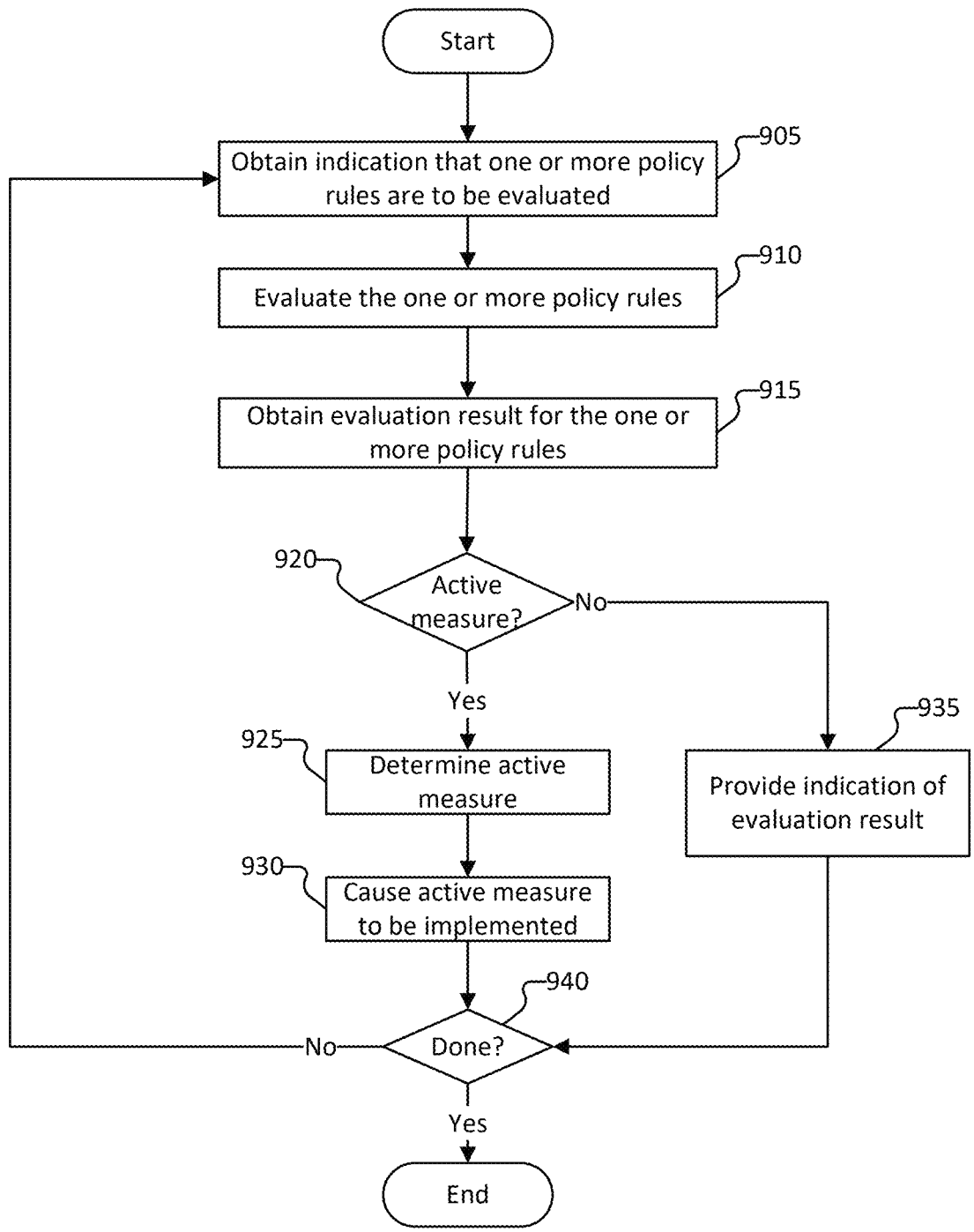
FIG. 9 is a flow diagram of a method for performing an active measure based on an evaluation of a policy rule.

FIG. 9 is a flow diagram of a method for performing an active measure based on an evaluation of a policy rule. In some embodiments, process 1000 is implemented by system 100 of FIG. 1, system 200 of FIG. 2, and/or system 300 of FIG. 3. In some embodiments, process 1100 is invoked by process 700 (e.g., at 720).

At 905, the system obtains an indication that one or more policy rules are to be evaluated. At 910, the one or more policy rules are evaluated. In some embodiments, process 700 and/or process 800 is invoked at 910. At 915, the system obtains an evaluation result for the one or more policy rules. At 920, the system determines whether to perform an active measure. In some embodiments, the system determines whether to perform an active measure based at least in part on the evaluation result. The system may determine whether to perform an active measure based on a configuration that active measures are to be implemented in response to the evaluation result having a certain result/value. In some embodiments, the system queries a mapping of contexts to active measures (e.g., a mapping of evaluation results to active measures to be implemented) to determine whether to perform an active measure. In response to determining that an active measure is to be implemented at 920, process 900 proceeds to 925. Conversely, in response to determining that an active measure is not to be implemented at 920, process 900 proceeds to 935. At 925, the system determines an active measure to be implemented. In some embodiments, the system queries a mapping of contexts to active measures (e.g., a mapping of evaluation results to active measures to be implemented) to determine the active measure associated with the context or particular evaluation result. At 930, the system causes the active measure to be implemented. The system may implement the active measure or provide an indication/instruction to another system or service for implementation. At 935, an indication of the evaluation result is provided. At 940, a determination is made as to whether process 900 is complete. In some embodiments, process 900 is determined to be complete in response to a determination that no further policy rules are obtained, no further policy rules are to be validated or evaluated, no further active measures are to be implemented, the active measure(s) is successfully implemented, the process has terminated, an administrator indicates that process 900 is to be paused or stopped, etc. In response to a determination that process 900 is complete, process 900 ends. In response to a determination that process 900 is not complete, process 900 returns to 905.

Although various examples of embodiments are described in connection with security policies and security policy rules, various embodiments may be similarly amended with respect to other policies or policy rules, such as policies/rules for handling network traffic, shaping network traffic, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing policy configurations, comprising:
one or more processors configured to:
receive a set of predefined security policy rules;
receive an indication of a particular intent with respect to a desired outcome with respect to a flow of network traffic across a network;
perform an intent satisfaction to determine one or more security policy rules of the set of predefined security policy rules that satisfy the particular intent, comprising:
generating one or more vector representations for the one or more security policy rules;
querying, based on the one or more vector representations, a prediction engine for a prediction of the one or more security policy rules that satisfy the particular intent; and
obtaining from the prediction engine the prediction of the one or more security policy rules that satisfy the particular intent, wherein the prediction engine implements a machine learning model;
determine an active measure for implementing the particular intent with respect to the set of predefined security policy rules; and
cause the active measure to be implemented; and
a memory coupled to the one or more processors and configured to provide the one or more processors with instructions.

2. The system of claim 1, wherein causing the active measure to be implemented includes generating and providing a report pertaining to the one or more security policy rules that indicates a recommendation for modifying at least one of the security policy rules to align the at least one of the security policy rules with the particular intent.

3. The system of claim 2, wherein the report pertaining to the one or more security policy rules includes an indication of the active measure.

4. The system of claim 1, wherein the one or more processors are further configured to:
receive a new security policy rule;
generate a vector representation for the new security policy rule; and
perform a priority or position analysis to determine a relationship between the new security policy rule and one or more of the set of predefined security policy rules.

5. The system of claim 4, wherein the new security policy rule is received and the priority or position analysis is performed before the new security policy rule is deployed to a security entity.

6. The system of claim 5, wherein the report includes an impact of deployment of the new security policy rules, and the report is provided before the new security policy rule is deployed to the security entity.

7. The system of claim 6, wherein the security entity is a firewall.

8. The system of claim 4, wherein the new security policy rule is received after deployment to a security entity.

9. The system of claim 4, wherein the priority or position analysis is performed with respect to deployed security policy rules at a predefined interval.

10. The system of claim 4, wherein performing the priority or position analysis includes monitoring a firewall and obtaining a report indicating an intent of at least one of the plurality of security policy rules.

11. The system of claim 1, wherein:
the one or more processors are further configured to:
receive a new security policy rule; and
determine an intent for the new security policy rule;
perform a priority or position analysis with respect to the intent for the new security rule, comprising:
determining intents for one or more security policy rules of the predefined security policy rules;
filtering the one or more security policy rules of the predefined security policy rules to remove a security policy rule that does not match the intent for the new security policy rule; and
performing an analysis between the new security policy rule and one or more resulting security policy rules output from the filtering of the one or more security policy rules.

12. The system of claim 11, wherein performing the priority or position analysis to determine a relationship among a plurality of security policy rules includes determining a permissiveness scoring with respect to the plurality of security policy rules.

13. The system of claim 1, wherein a satisfiability modulo theories (SMT) solver to determine a security policy rule satisfying the particular intent or contradicting the particular intent.

14. The system of claim 1, wherein the prediction engine uses the machine learning model to perform a clustering with respect to the plurality of security policy rules.

15. The system of claim 4, wherein the priority or position analysis is performed based at least in part on the vector representation for the new security policy rule and the one or more vector representations for the one or more security policy rules.

16. The system of claim 4, wherein determining the relationship between the new security policy rule and one or more of the set of predefined security policy rules comprises determining whether the new security policy rule is inconsistent with respect to one or more of the security policy rules.

17. The system of claim 16, wherein an active measure is determined for resolving an inconsistency between the new security policy and the set of predefined security policy rules.

18. The system of claim 17, wherein the active measure for resolving the inconsistency comprises deleting an inconsistent security policy rule.

19. A method for managing policy configurations, comprising:

receiving, by one or more processors, a set of predefined security policy rules;
receiving an indication of a particular intent with respect to a desired outcome with respect to a flow of network traffic across a network;
performing an intent satisfaction to determine one or more security policy rules of the set of predefined security policy rules that satisfy the particular intent, comprising:
generating one or more vector representations for the one or more security policy rules;
querying, based on the one or more vector representations, a prediction engine for a prediction of the one or more security policy rules that satisfy the particular intent; and
obtaining from the prediction engine the prediction of the one or more security policy rules that satisfy the particular intent, wherein the prediction engine implements a machine learning model;
determining an active measure for implementing the particular intent with respect to the set of predefined security policy rules; and
causing the active measure to be implemented.

20. A computer program product embodied in a non-transitory computer readable medium for managing policy configurations, and the computer program product comprising computer instructions for:
receiving, by one or more processors, a set of predefined security policy rules;
receiving an indication of a particular intent with respect to a desired outcome with respect to a flow of network traffic across a network;
performing an intent satisfaction to determine one or more security policy rules of the set of predefined security policy rules that satisfy the particular intent, comprising:
generating one or more vector representations for the one or more security policy rules;
querying, based on the one or more vector representations, a prediction engine for a prediction of the one or more security policy rules that satisfy the particular intent; and
obtaining from the prediction engine the prediction of the one or more security policy rules that satisfy the particular intent, wherein the prediction engine implements a machine learning model;
determining an active measure for implementing the particular intent with respect to the set of predefined security policy rules; and
causing the active measure to be implemented.

* * * * *